US006710520B1

United States Patent
Brown et al.

(10) Patent No.: US 6,710,520 B1
(45) Date of Patent: Mar. 23, 2004

(54) STRESS RELIEF MECHANISM FOR OPTICAL INTERFERENCE COATINGS

(75) Inventors: Peter W. Brown, Twinsburg, OH (US); Rajasingh Israel, Westlake, OH (US); Carl Gunter, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 09/645,225

(22) Filed: Aug. 24, 2000

(51) Int. Cl.[7] .................. H01J 61/40; H01K 1/3232
(52) U.S. Cl. .................. 313/112; 313/110; 313/113; 313/114; 313/635; 313/578; 313/580; 359/584; 359/586; 359/885
(58) Field of Search .................. 313/112, 110, 313/113, 114, 115, 635, 578–580; 359/584, 586, 885

(56) References Cited

U.S. PATENT DOCUMENTS

| 4,652,789 | A | * | 3/1987 | Kawakatsu et al. | ......... 313/112 |
| 4,949,005 | A | | 8/1990 | Parham et al. | |
| 5,138,219 | A | | 8/1992 | Krisl et al. | |
| 5,569,970 | A | * | 10/1996 | Dynys et al. | ............... 313/112 |
| 5,680,001 | A | | 10/1997 | Mulder et al. | |
| 5,681,666 | A | * | 10/1997 | Treger et al. | ............... 324/435 |
| 5,843,518 | A | * | 12/1998 | Li et al. | ..................... 427/107 |
| 5,944,964 | A | * | 8/1999 | Solberg et al. | ........ 204/192.12 |
| 5,982,078 | A | * | 11/1999 | Krisl et al. | ................. 313/112 |
| 6,087,775 | A | * | 7/2000 | Levinson et al. | ........... 313/112 |

* cited by examiner

Primary Examiner—Nimeshkumar D. Patel
Assistant Examiner—Sikha Roy
(74) Attorney, Agent, or Firm—Pearne & Gordon LLP

(57) ABSTRACT

An optical interference coating for reflecting infra-red radiation and transmitting visible light. The coating comprises alternating layers of high index of refraction material and low index of refraction material. As the total number of layers increases, the ratio of high index of refraction material to low index of refraction material must also increase.

32 Claims, 1 Drawing Sheet

STRESS RELIEF MECHANISM FOR OPTICAL INTERFERENCE COATINGS

BACKGROUND OF THE INVENTION

Thin film optical coatings known as interference filters which comprise alternating layers of two or more materials of different indices of refraction are well known to those skilled in the art. Such coatings or films are used to selectively reflect or transmit light radiation from various portions of the electromagnetic radiation spectrum such as ultraviolet, visible and infrared radiation. These films or coatings are used in the lamp industry to coat reflectors and lamp envelopes. One application in which these thin film optical coatings are useful is to improve the illumination efficiency or efficacy of incandescent lamps by reflecting infrared energy emitted by a filament or arc back to the filament or arc while transmitting the visible light portion of the electromagnetic spectrum emitted by the filament. This lowers the amount of electrical energy required to be supplied to the filament to maintain its operating temperature.

In other applications where it is desired to transmit infrared radiation, such filters can reflect the shorter wavelength portions of the spectrum, such as ultraviolet and visible light portions emitted by the filament or arc and transmit primarily the infrared portion in order to provide heat radiation with little or no visible light radiation. Such an application of this latter type would include a typical radiant heater for residential or industrial use where visible radiation emitted by the heater is unwanted.

Such interference filters useful for applications where the filter will be exposed to high temperatures in excess of about 500° C. have been made of alternating layers of tantala (tantalum pentoxide $Ta_2O_5$) and silica ($SiO_2$), wherein the silica is the low refractive index material and the tantala is the high refractive index material. These interference filters may be obtained by a low pressure chemical vapor deposition (LPCVD) process to produce the film on a suitable substrate as described in U.S. Pat. No. 4,949,005, the contents of which are hereby incorporated by reference.

Improvements in the performance of LPCVD $Ta_2O_5$:$SiO_2$ thin film systems have been largely limited by mechanical failure, due to excessive tensile stress in the coating. The limiting number of layers has historically been 46, above which the coatings spall off the substrates. Competitive pressures require the performance of halogen IR films to be improved, with respect to the lumens output per watt consumed, while keeping color quality high.

Previous approaches typically have been to (1) increase the number of layers, (2) switch to a material system with a larger difference in the indices of refraction (n) between the two selected materials, or (3) induce some form of stress relief in some of the layers.

Difficulty with the first approach has typically been with regard to stress. With an increasing number of layers for a given design, the stress (tensile for LPCVD) also increases, ultimately resulting in cohesive failure of the substrate.

Difficulty with the second approach has typically been with regard to finding compatible materials and processes. Relatively few material systems (combinations of high and low index materials) exist which are suited for the intended environment, and also lend themselves to practical processing techniques.

There are also difficulties with the third approach. For example, U.S. Pat. No. 5,680,001, the contents of which is hereby incorporated by reference, describes a method of depositing an adhesive layer between the substrate and the film. These adhesive layers are typically silica doped with either $B_2O_3$ or phosphorous pentoxide. These films are hydroscopic, which can lead to detrimental effects on the film.

U.S. Pat. No. 4,949,005 describes a method of annealing tantala/silica structures as a means of relieving stress in the film. This technique is currently in practice for the 46 layer design deposited commercially on halogen filament tubes. The benefits of thermal annealing are supplementary to the invention disclosed presently.

Thus, there is a need to improve the performance of IR reflecting films. The thickness of the alternating layers of tantala and silica are designed such that the visible spectrum is transmitted through the coatings, and the IR energy is reflected, as disclosed in U.S. Pat. No. 5,138,219, the contents of which is hereby incorporated by reference. An increase in performance could be expected simply by increasing the number of layers. However, the internal stresses in the film also increase with the number of layers, for a given design.

SUMMARY OF THE INVENTION

An optical interference coating for reflecting infra-red radiation and transmitting visible light comprising alternating layers of high index of refraction material and low index of refraction material, wherein the total number of said layers is greater than 51.

DETAILED DESCRIPTION OF THE PREFERRED EMBODIMENTS OF THE INVENTION

Figure 1:
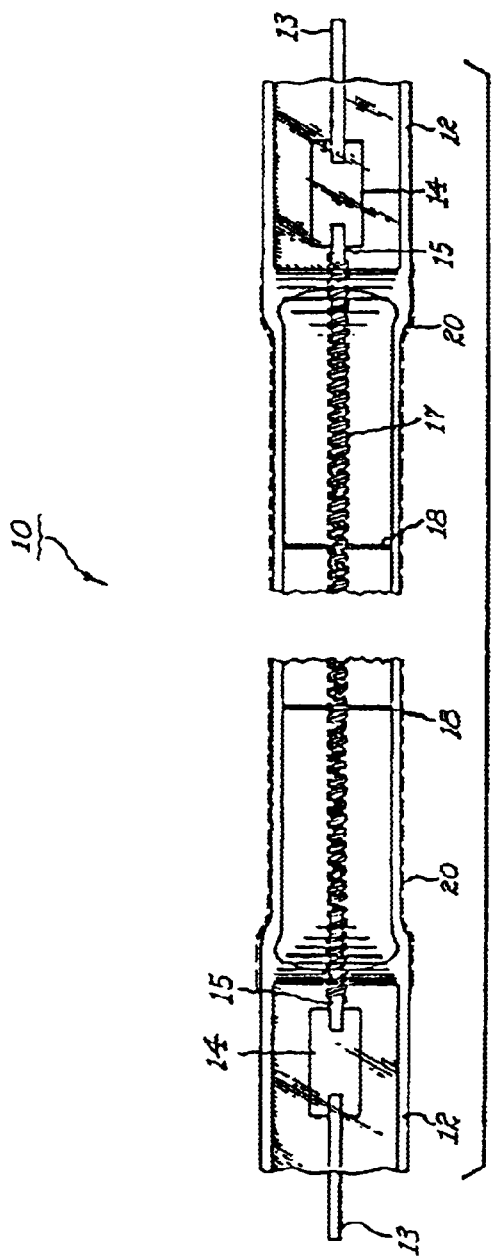
FIG. 1 is a side view of an elongated tungsten halogen lamp having a tantala-silica interference film according to the present invention on the outer surface.

FIG. 1 illustrates one embodiment of the present invention comprising a lamp, the outer surface of which contains a tantala-silica interference filter according to the present invention which reflects infrared radiation back to the filament wherein it is converted into visible radiation.

The lamp illustrated in FIG. 1 comprises envelope 10 made out of a vitreous, light transmissive material capable of withstanding high temperatures of about 800° C., preferably quartz. Each end of envelope 10 has a pinch seal portion 12 through which is sealed an inlead connector 13 electrically and mechanically attached by suitable means, such as welding, to molybdenum foil 14 which is hermetically sealed and embedded in the pinch seal portion 12 of the lamp. Leads 15 are made out of a suitable refractory metal, such as molybdenum or tungsten, and are attached to the other end of molybdenum foils 14 at one end and at the other end are connected to tungsten filament 17 which is supported on its axis within the envelope by a plurality of suitable supporting members 18, such as tungsten spiral wire supports of the type disclosed in U.S. Pat. No. 3,168,670, the contents of which are hereby incorporated by reference. The thin film optical interference filter or film or coating 20 is on the outer surface of the lamp as a continuous coating. The coating 20 can be used on any type of electric lamp, such as preferably incandescent or arc lamps or less preferably fluorescent lamps. For example, the coating 20 can be used on incandescent halogen lamps such as shown in FIGS. 6 and 7 of U.S. Pat. No. 5,138,219, the contents of which are incorporated herein by reference.

As set forth above, film or coating 20 consists of alternating layers of tantala and silica arranged so as to adjust the pass-band and the stop-band characteristics of the emitted radiation of the lamp.

A ratio can be calculated between the high and low index materials for a given design. For an IR reflecting thin film design comprised of alternating tantala and silica layers, the $Ta_2O_5:SiO_2$ ratio can be defined as:

$$r = T/S$$

wherein T represents the total thickness of all the $Ta_2O_5$ layers and S represents the total thickness of all the $SiO_2$ layers.

The overall tensile stress in a tantala-silica coating is determined by (1) the total thickness, and (2) the value of r. Mechanical stresses in the coatings are dependent on the value of r more than the optical performance is dependent on the value of r. As such, one can adjust the value of r for the film sufficiently to allow for more layers to be deposited without mechanical failure occurring.

It has been surprisingly found that as the value of r is increased for a given number of layers, the mechanical stresses decrease. As a result, for the first time, more than 51 layers can be used in the interference coating without suffering mechanical failure due to tensile stresses. Coatings can be produced having greater than 51, 55, 60, 65, 70, 75, 78, 80, 85 or 90 total layers. Optionally, the total number of layers will be less than 200. In order to use more than 51 layers, the $Ta_2O_5:SiO_2$ ratio must be increased as the number of layers (i.e. the total thickness) in the interference coating is increased, in order to maintain mechanical integrity. The value of the ratio may be at least 0.9, 0.95, 1.0, 1.1, 1.2, 1.3, 1.5, 2.0, 3.0 or 4.0.

The following Example further illustrates various aspects of the invention.

EXAMPLE

Various interference layers were produced. All the layers were 78-layer designs. The $Ta_2O_5:SiO_2$ ratio (r) was varied, and the mechanical stability was observed and rated as "pass" (mechanically stable) or "fail" (mechanical failure). The results are as follows.

| r | Pass/Fail |
|---|---|
| 0.63 | Fail |
| 0.66 | Fail |
| 0.69 | Fail |
| 0.76 | Fail |
| 0.91 | Pass |
| 1.09 | Pass |
| 1.3 | Pass |

Other 78-layer designs were produced with r values ranging between 0.91 and 1.3. All of those layers exhibited mechanical stability.

Although the preferred embodiments of the invention have been shown and described, it should be understood that various modifications may be resorted to without departing from the scope of the invention as disclosed and claimed herein.

What is claimed is:

1. An optical interference coating for reflecting infrared radiation and transmitting visible light comprising alternating layers of high index of refraction material and low index of refraction material, the total number of said layers being greater than 60, said optical interference coating having sufficiently low tensile stress such that said optical interference coating is not susceptible to cohesive failure from tensile stress, each of said alternating layers of high index of refraction material and low index of refraction material being a separate and distinct layer from adjacent layers.

2. An optical interference coating as in claim 1, wherein the high index of refraction material is tantalum pentoxide and the low index of refraction material is silica.

3. An optical interference coating as in claim 1, wherein a ratio of the total thickness of all of the layers of high index of refraction material to the total thickness of all of the layers of low index of refraction material, r, is at least 0.9.

4. An optical interference coating as in claim 1, wherein a ratio of the total thickness of all of the layers of high index of refraction material to the total thickness of all of the layers of low index of refraction material, r, is at least 0.95.

5. An optical interference coating as in claim 1, wherein a ratio of the total thickness of all of the layers of high index of refraction material to the total thickness of all of the layers of low index of refraction material, r, is at least 1.0.

6. An optical interference coating as in claim 1, wherein a ratio of the total thickness of all of the layers of high index of refraction material to the total thickness of all of the layers of low index of refraction material, r, is at least 1.2.

7. An optical interference coating as in claim 1, wherein the total number of layers is greater than 70.

8. An optical interference coating as in claim 1, wherein the total number of layers is 78.

9. An optical interference coating as in claim 1, wherein the total number of layers is less than 200.

10. An electric lamp comprising a light transmissive envelope containing an electric light source within, wherein at least a portion of said envelope is coated with an optical interference coating for reflecting infrared radiation and transmitting visible light radiation, said coating comprising alternating layers of high index of refraction material and low index of refraction material, the total number of said layers being greater than 60, said optical interference coating having sufficiently low tensile stress such that said optical interference coating is not susceptible to cohesive failure from tensile stress, each of said alternating layers of high index of refraction material and low index of reaction material being a separate and distinct layer from adjacent layers.

11. An electric lamp as in claim 10, wherein the high index of refraction material is tantalum pentoxide and the low index of refraction material is silica.

12. An electric lamp as in claim 10, wherein a ratio of the total thickness of all of the layers of high index of refraction material to the total thickness of all of the layers of low index of refraction material, r, is at least 0.9.

13. An electric lamp as in claim 10, wherein the total number of layers is 78.

14. An electric lamp as in claim 10, wherein the total number of layers is less than 200.

15. An optical interference coating as in claim 1, wherein a ratio of the total thickness of all of the layers of high index of refraction material to the total thickness of all of the layers of low index of refraction material, r, is at least 0.91, and the total number of said layers is at least 78.

16. An optical interference coating as in claim 1, wherein a ratio of the total thickness of all of the layers of high index of refraction material to the total thickness of all of the layers of low index of refraction material, r, is at least 0.9.

17. An electric lamp as in claim 10, wherein a ratio of the total thickness of all of the layers of high index of refraction material to the total thickness of all of the layers of low index of refraction material, r, is at least 0.91, and the total number of said layers is at least 78.

18. An electric lamp as in claim 10, wherein a ratio of the total thickness of all of the layers of high index of refraction material to the total thickness of all of the layers of low index of refraction material, r, is at least 0.9.

19. An optical interference coating for reflecting infrared radiation and transmitting visible light comprising alternating layers of high index of refraction material and low index of refraction material, each of said alternating layers of high index of refraction material and low index of refraction material being a separate and distinct layer from adjacent layers, the total number of said layers of high index of refraction material and low index of refraction material being greater than 51, wherein a ratio of the total thickness of all of the layers of high index of refraction material to the total thickness of all of the layers of low index of refraction material, r, is at least 0.9.

20. An optical interference coating according to claim 19, said ratio, r, being at least 0.95.

21. An optical interference coating according to claim 19, said ratio, r, being at least 1.0.

22. An optical interference coating according to claim 19, the total number of layers of high index of refraction material and low index of refraction material being greater than 55.

23. An electric lamp comprising a light transmissive envelope containing an electric light source within, wherein at least a portion of said envelope is coated with an optical interference coating for reflecting infrared radiation and transmitting visible light radiation, said coating comprising alternating layers of high index of refraction material and low index of refraction material, each of said alternating layers of high index of refraction material and low index of refraction material being a separate and distinct layer from adjacent layers, the total number of said layers of high index of refraction material and low index of refraction material being greater tan 51, wherein a ratio of the total thickness of all of the layers of high index of refraction material to tho total thickness of all of the layers of low index of refraction material, r, is at least 0.9.

24. An electric lamp according to claim 23, said ratio, r, being at least 0.95.

25. An electric lamp according to claim 23, said ratio, r, being at least 1.0.

26. An electric lamp according to claim 23, the total number of layers of high index of refraction material and low index of refraction material being greater than 55.

27. An optical interference coating according to claim 19, the total number of layers of high index of refraction material and low index of refraction material being greater than 60.

28. An optical interference coating according to claim 19, said ratio, r, being effective to result in sufficiently low tensile stress in said optical interference coating such that said optical interference coating is not susceptible to cohesive failure from tensile stress.

29. An optical interference coating according to claim 19, the total number of layers of high index of refraction material and low index of refraction material being greater than 60, and said ratio, r, being effective to result in sufficiently low tensile stress in said optical interference coating such that said optical interference coating is not susceptible to cohesive failure from tensile stress.

30. An electric lamp according to claim 23, the total number of layers of high index of refraction material and low index of refraction material being greater than 60.

31. An electric lamp according to claim 23, said ratio, r, being effective to result in sufficiently low tensile stress in said optical interference coating such that said optical interference coating is not susceptible to cohesive failure from tensile stress.

32. An electric lamp according to claim 23, the total number of layers of high index of refraction material and low index of refraction material being greater than 60, and said ratio, r, being effective to result in sufficiently low tensile stress in said optical interference coating such that said optical interference coating is not susceptible to cohesive failure from tensile stress.

* * * * *

UNITED STATES PATENT AND TRADEMARK OFFICE
CERTIFICATE OF CORRECTION

PATENT NO. : 6,710,520 B1
DATED : March 23, 2004
INVENTOR(S) : Peter W. Brown et al.

It is certified that error appears in the above-identified patent and that said Letters Patent is hereby corrected as shown below:

Title page,
Item [56], References Cited, U.S. PATENT DOCUMENTS, please insert therefor
-- 3,168,670 A  2/1965  Levand, Jr. ...... 313/274 --.

Column 6,
Line 12, please delete "tan" and insert therefor -- than --.
Line 13, please delete "tho" and insert therefor -- the --.

Signed and Sealed this

First Day of March, 2005

JON W. DUDAS
*Director of the United States Patent and Trademark Office*